DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 7, 1976

950 O.G. 5

T950,003

PROCESS FOR PREPARING PROTECTIVE FIBROUS PACKAGING FORMS

Cephas H. Sloan, Rte. 3, Lakeshore Drive, Kingsport, Tenn. 37663

Filed Apr. 3, 1975, Ser. No. 564,939
Int. Cl.[2] B29C 27/22
U.S. Cl. 264—271
No Drawing. 3 Pages Specification

Process for forming cellulose acetate staple fiber or continuous filament fiber into a protective package for articles. The cellulose acetate fiber is sprayed with a non-tacky bonding plasticizer in the amount of 3–20% by weight and then packed around the article to be protected. The fiber bonds without heat to form a firm protective covering for the article. The preferred bonding plasticizers are prepared from low molecular weight acid esters of glycerol or triethylene glycol.